United States Patent
Fuma et al.

(10) Patent No.: US 12,024,254 B2
(45) Date of Patent: Jul. 2, 2024

(54) MOTORCYCLE AIRBAG DEVICE

(71) Applicant: Autoliv Development AB, Vargarda (SE)

(72) Inventors: Makoto Fuma, Kanagawa (JP); Sho Murakami, Kanagawa (JP); Ryota Ishigaki, Kanagawa (JP); Masaru Habu, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/758,432

(22) PCT Filed: Dec. 23, 2020

(86) PCT No.: PCT/JP2020/048311
§ 371 (c)(1),
(2) Date: Jul. 6, 2022

(87) PCT Pub. No.: WO2021/140922
PCT Pub. Date: Jul. 15, 2021

(65) Prior Publication Data
US 2023/0023183 A1 Jan. 26, 2023

(30) Foreign Application Priority Data
Jan. 11, 2020 (JP) .................. 2020-003281

(51) Int. Cl.
*B62J 27/20* (2020.01)
*B60R 21/231* (2011.01)

(52) U.S. Cl.
CPC ............. *B62J 27/20* (2020.02); *B60R 21/231* (2013.01); *B60Y 2200/12* (2013.01)

(58) Field of Classification Search
CPC .... B62J 27/20; B60R 21/231; B60Y 2200/12; B60Y 2200/122; B60Y 2200/126; B62K 2202/00; B62K 11/00
See application file for complete search history.

(56) References Cited

U.S. PATENT DOCUMENTS

| | | | |
|---|---|---|---|
| 2004/0026904 A1* | 2/2004 | Yamazaki | B60R 21/16 280/730.1 |
| 2006/0056943 A1* | 3/2006 | Tsunoda | B62J 27/20 414/277 |

FOREIGN PATENT DOCUMENTS

| | | |
|---|---|---|
| CN | 1496911 | 5/2004 |
| CN | 1597427 | 3/2005 |

(Continued)

OTHER PUBLICATIONS

JP 2005008055—Machine Translation (20 pgs).
(Continued)

*Primary Examiner* — Keith J Frisby
(74) *Attorney, Agent, or Firm* — Matthew D. Thayne; Thayne and Davis LLC

(57) ABSTRACT

To provide a motorcycle airbag device that contributes to the stabilization of the deployment behavior and the deployment posture of the airbag.
An airbag device mounted on a motorcycle having a gas generator that generates an expansion gas, where the airbag is expanded by the expansion gas, and by deploying in front of the occupant, restrains forward movement of the occupant. Furthermore, the airbag has a stepped portion that protrudes forward when deployed and is supported by a structural portion around the top of the handlebars of the motorcycle.

17 Claims, 6 Drawing Sheets

(56) References Cited

FOREIGN PATENT DOCUMENTS

| JP | 4181843 | | | 5/2004 | | |
|----|---------|---|---|--------|---|---|
| JP | 2004136790 | A | * | 5/2004 | .............. | B62J 27/00 |
| JP | 2005-8055 | A | | 1/2005 | | |
| JP | 4181843 | B2 | | 11/2008 | | |
| JP | 2009040421 | A | * | 2/2009 | ........... | B60R 21/233 |
| JP | 2018052285 | A | * | 4/2018 | .............. | B62J 27/00 |
| JP | 2005008055 | | | 12/2019 | | |
| WO | WO-2009003854 | A2 | * | 1/2009 | ........... | B60R 21/233 |

OTHER PUBLICATIONS

P711414-JP_Office Action 1 (4 pgs).
P711414-JP_Office Action—Machine Translation (4 pgs).
JP 4181843—Machine Translation (20 pgs).
Aug. 16, 2023 P711414-JP-CN—First Office Action (6pgs).
P711414-JP-CN—machine translation of the First Office Action (12 pgs).
CN1496911 Machine Translation (10 pgs).
CN1597427 Machine Translation (9 pgs).

\* cited by examiner

MOTORCYCLE AIRBAG DEVICE

TECHNICAL FIELD

The present invention relates to a motorcycle airbag device mounted on a motorcycle.

BACKGROUND ART

Equipping of an automobile (four wheels) with one or a plurality of airbags to protect the occupants in the event of an accident is becoming standard. In a similar manner, equipping a motorcycle (two wheels) with an airbag device has been proposed and implemented.

In an airbag device mounted in an automobile, the airbag is deployed with the steering wheel, instrument panel, and the like as support surfaces (reaction surface), thus stabilizing the deployment behavior and deployment posture of the airbag is relatively easy. On the other hand, regarding an airbag mounted on a motorcycle, there are not very many parts for supporting a deployed airbag so stabilizing the deployment behavior and deployment posture is a challenge.

DISCLOSURE OF THE INVENTION

Problem to be Solved by the Invention

In light of the conditions described above, an object of the present invention is to provide a motorcycle airbag device that imparts stability to the deployment behavior and deployment posture thereof.

Means to Solve the Problem

In order to achieve the object described above, the present invention is an airbag device mounted on a motorcycle having a gas generator that generates an expansion gas, where the airbag is expanded by the expansion gas, and by deploying in front of the occupant, restrains forward movement of the occupant. Furthermore, the airbag has a stepped portion that protrudes forward when deployed and is supported by a structural portion around the top of the handlebars of the motorcycle.

Here, "restraining the forward movement of the occupant" means at least preventing the occupant from being thrown forward by a collision and preventing the occupant's head from colliding with the front part of the motorcycle.

Furthermore, "protruding forward" means at least a state of bulging forward in a convex shape with respect to other peripheral regions.

In the present invention as described above, a stepped portion that protrudes forward when the airbag is deployed and is supported on the structural portion surrounding the top of the handlebars of the motorcycle is provided so the stepped portion can gain a reaction force from this structural portion when the airbag is deployed. As a result, the deployment behavior and deployment posture of the airbag are stable, and even when the occupant's head collides with the airbag, the airbag does not fall forward nor is greatly deformed, and the head of the occupant can reliably be restrained.

The structural portion can include at least one of an upper surface of an instrument such as a speedometer, top of the handlebars, or an upper surface of a headlight.

The present invention can be applied to all types of motorcycles. For example, this includes scooters, adventures, tourers, sports tourers, scramblers, classics (retro), Americans (cruisers), naked bikes, street fighters, off-road supermotos, supersports, street bikes, minibikes and the like. Further, the vehicle to which the present invention is applicable to is not limited in the number of wheels, and can be applied to a three-wheeled motorcycle (trike), a four-wheeled buggy, and the like in addition to two wheeled vehicles.

In particular, the riding posture of the occupant is relatively high for a scooter type motorcycle. Therefore, the upper part of the airbag needs to be made large (tall) and stabilizing the deployment behavior and deployment posture is a significant challenge.

The airbag can have a structure that includes a rear panel facing the occupant, a front panel facing the rear panel, and side panels connected to at least a part of the outer edges of the front panel and the rear panel.

The side panel can have a structure so as to include a convex portion protruding forward when the airbag in a deployed state is viewed from the side and the stepped portion is formed by this convex portion.

The convex portion of the side panel includes a right convex portion and a left convex portion positioned on both left and right sides of the airbag, and when the airbag is deployed, the right convex portion and the left convex portion pull the front panel and cause the stepped portion to be formed.

In this manner, the stepped portion can be formed in the airbag by devising the shape of the side panel, and so providing a tether or using a complex panel structure are not absolutely necessary to form the stepped portion.

The side panels can be configured to extend over the entire circumference of the outer edges of the front panel and rear panel.

DESCRIPTION OF THE PREFERRED EMBODIMENTS

The motorcycle airbag device according to the present invention will be described with reference to the accompanying drawings.

In the following description, the travel direction of the motorcycle is referred to as "forward", the opposite direction is referred to as "rear", and when the coordinate axes are indicated, this is referred to as the "front-rear direction". Further, the right side with respect to the travel direction is referred to as "right direction", the left side is referred to as "left direction", and when coordinate axes are indicated, this is referred to as the "left-right direction". Further, the vertical upward direction is referred to as "upward", the vertical lower direction is referred to as "downward", and when the coordinate axes are indicated, this is referred to as "vertical direction".

Figure 1:
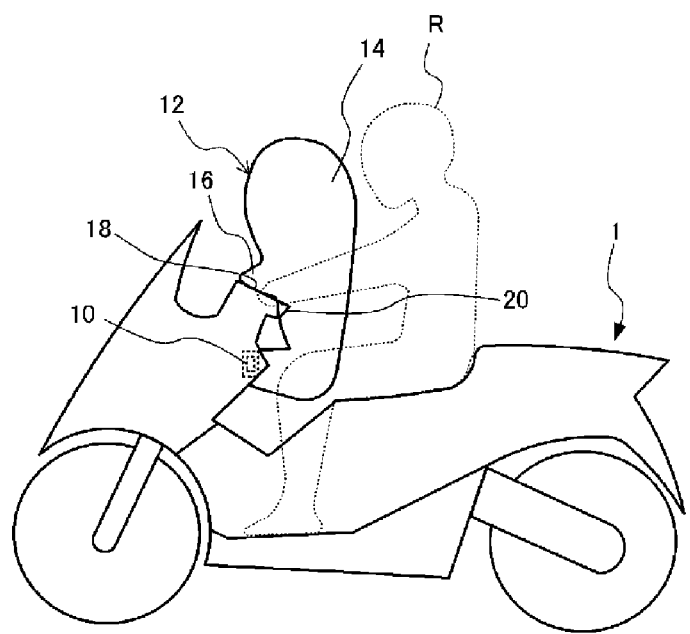
FIG. 1 is a side view illustrating a state in which a motorcycle airbag device according to the present invention is operated.
Figure 1:
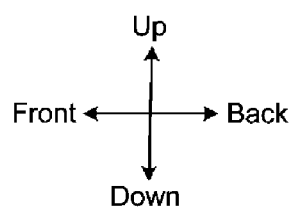
Figure 2:
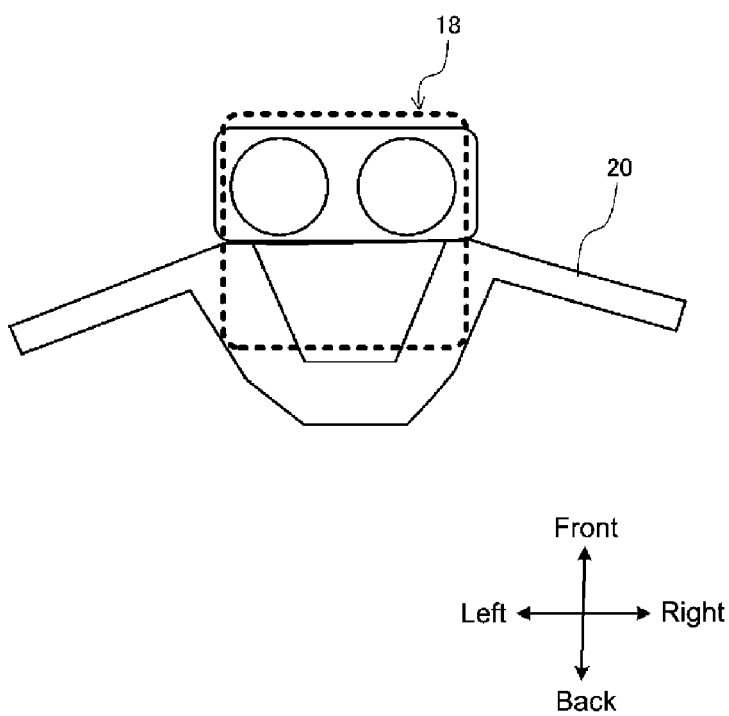
FIG. 2 is a plan view illustrating the conditions around the handlebars of a motorcycle to which the airbag device according to the present invention is applied.

FIG. 1 is a side view illustrating a state in which a motorcycle airbag device according to the present invention is operated. FIG. 2 is a plan view illustrating the conditions around the handlebars of a motorcycle to which the airbag device according to the present invention is applied.

The airbag device according to the present invention is mounted on a scooter type motorcycle 1 and can be stowed in the area below the handlebars 20. The airbag device includes a gas generator 10 that generates an expansion gas and an airbag 12 that is expanded by the expansion gas and deployed in front of the occupant (rider) R to restrain forward movement of the occupant R. Furthermore, the airbag 12 has a main chamber portion positioned in front of the occupant R and a stepped portion 16 that protrudes forward when deployed, and is supported by a structural portion 18 around the top of the handlebars of the motorcycle 1.

Note, the motorcycle airbag device according to the present invention is applicable not only to a scooter type motorcycle but also to all types of motorcycles. For example, the airbag device can be mounted on scooters, adventures, tourers, sports tourers, scramblers, classics (retro), Americans (cruisers), naked bikes, street fighters, off-road supermotos, supersports, street bikes, minibikes and the like.

As illustrated in FIG. 2, the structural portion 18 can include at least one of an upper surface of an instrument such as a speedometer, top of the handlebars, or an upper surface of a headlight. In this manner, the structural portion 18 may differ depending on the type, size, and the like of the motorcycle.

In the present invention as described above, when the airbag 12 is deployed, since the stepped portion 16, which is supported by the structural portion 18 surrounding the top of the handlebars, is provided, the stepped portion 16 can obtain a reaction force from the structural portion 18. As a result, the deployment behavior and deployment posture of the airbag 12 are stable, and even when the head of the occupant R collides with the airbag 12, the airbag 12 does not fall forward nor is greatly deformed, and the head of the occupant R can reliably be restrained.

The present invention is particularly useful in scooter-type motorcycles. This is because the riding posture of the occupant R is relatively high for a scooter type motorcycle. Therefore, the upper part of the airbag 12 needs to be made large (tall) and stabilizing the deployment behavior and deployment posture of the airbag 12 is difficult.

Embodiment 1

Figure 3:
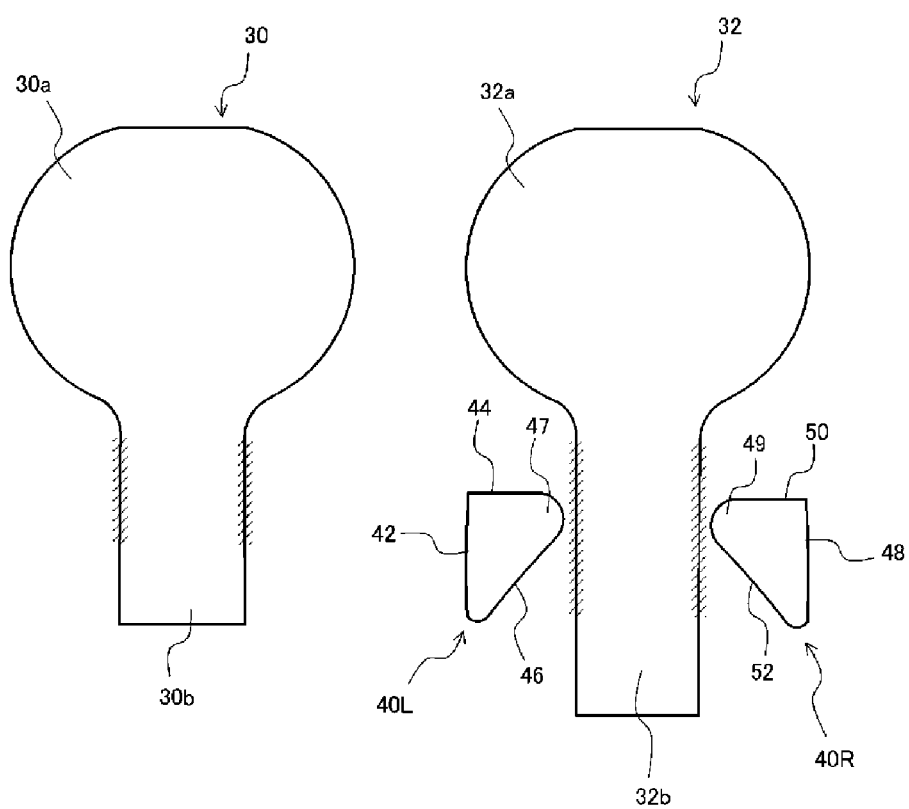
FIG. 3 is a plan view illustrating a panel shape of an airbag used in an airbag device according to Embodiment 1 of the present invention.
Figure 4:
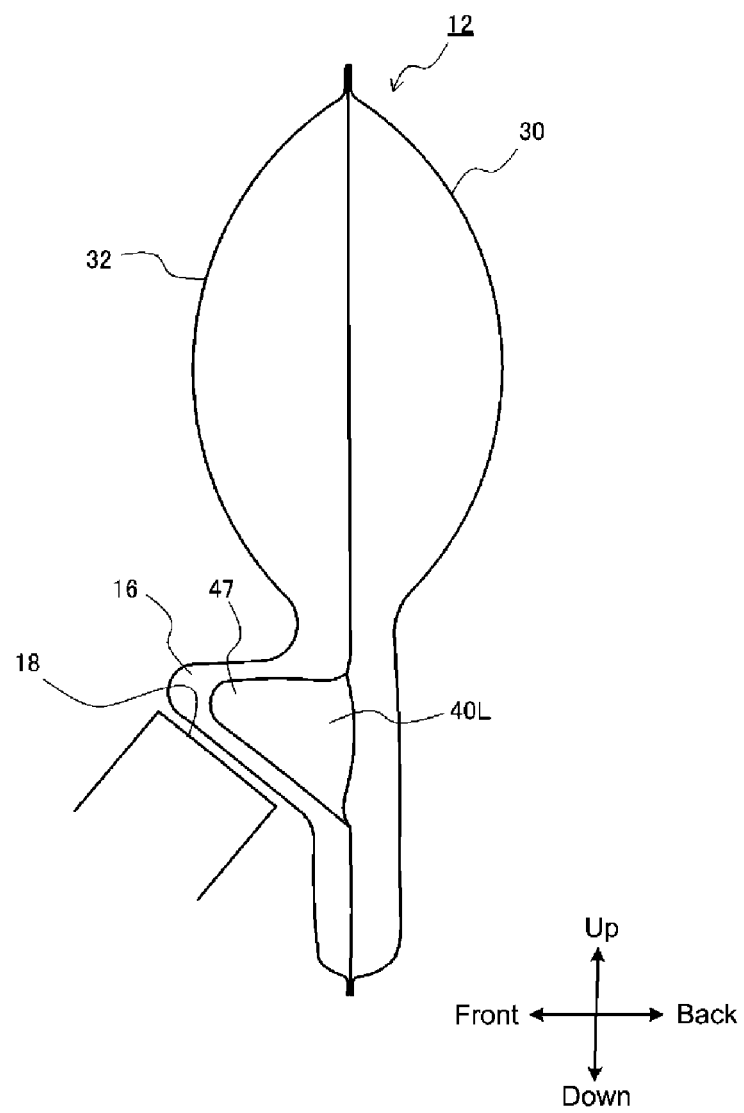
FIG. 4 is a side view illustrating how the airbag according to Embodiment 1 of the present invention is deployed.

FIG. 3 is a plan view illustrating a panel shape of an airbag used in an airbag device according to Embodiment 1 of the present invention. FIG. 4 is a side view illustrating how the airbag according to Embodiment 1 of the present invention is deployed.

The airbag can include a rear panel 30 facing the occupant R, a front panel 32 facing the rear panel 30, and side panels 40L and 40R connected to at least a part of the outer edges of the front panel 32 and the rear panel 30.

The rear panel 30 includes a substantially circular main region 30a positioned in front of the occupant R when the airbag is deployed, and a substantially rectangular lower region 30b connected to and below the main region 30a. On the other hand, the front panel 32 includes a substantially circular main region 32a facing (overlapping) the main region 30a of the rear panel 30 and a substantially rectangular lower region 32b connected to and below the main region 32a. Here, the lower region 32b of the front panel 32 is formed longer than the lower region 30b of the rear panel 30 in order to connect the side panels 40L and 40R as described below.

As illustrated in FIG. 3, the side panels 40L and 40R are substantially triangular and have the same shape (symmetrical). Furthermore, the edges 44 and 46 of the side panel 40L are sewn or adhered to the left side (indicated by diagonal lines) of the lower region 32b of the front panel 32. In addition, the edge 42 of the side panel 40L is sewn or adhered to the left side (indicated by diagonal lines) of the lower region 30b of the rear panel 30. In a similar manner, the edges 50 and 52 of the side panel 40R are sewn or adhered to the right side (indicated by diagonal lines) of the lower region 32b of the front panel 32. In addition, the edge 48 of the side panel 40R is sewn or adhered to the right side (indicated by diagonal lines) of the lower region 30b of the rear panel 30.

In addition, as illustrated in FIG. 4, the edges of the portions of the rear panel 30 and the front panel 32 that are not connected to the side panels 40L and 40R are connected to each other by sewing or adhesive.

Note, the convex portions 47 and 49 of the side panels 40L and 40R are arranged on the left and right side portions of the airbag 12, and when the airbag 12 is deployed, the front panel 32 is pulled by these convex portions 47 and 49 causing the stepped portion 16 to be formed over the entire width of the front panel 32. Furthermore, as illustrated in FIG. 4, when the airbag 12 is deployed, the lower surface of the stepped portion 16 comes into contact with the structural portion 18.

In this manner, by devising the shapes of the side panels 40L and 40R, the stepped portion 16 can be formed on the airbag 12, and providing a tether or using a complex panel structure is not absolutely necessary.

Figure 5:
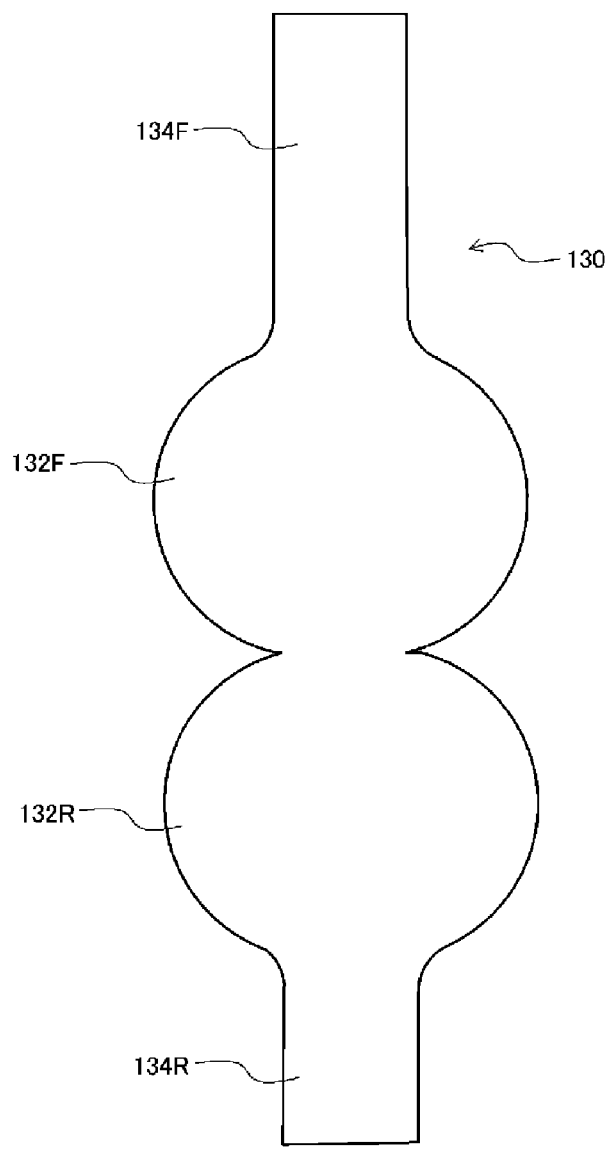
FIG. 5 is a plan view illustrating another aspect of a panel (main panel) that can be applied to the present invention.

FIG. 5 is a plan view illustrating another aspect of a panel (main panel) that can be applied to the present invention. The panel 130 illustrated in FIG. 5 basically has a structure in which the front panel 32 and the rear panel 32 shown in FIG. 3 are vertically connected. The panel 130 includes a substantially circular front main region 132F, a rear main region 132R, a substantially rectangular front lower region 134F, and a rear lower region 134R. Furthermore, similar side panels (40L, 40R) to those illustrated in FIG. 3 are connected to the side edges of the front lower region 134F and the rear lower region 134R.

By adopting the panel 130 as illustrated in FIG. 5, the number of panels can be minimized.

Embodiment 2

Figure 6:
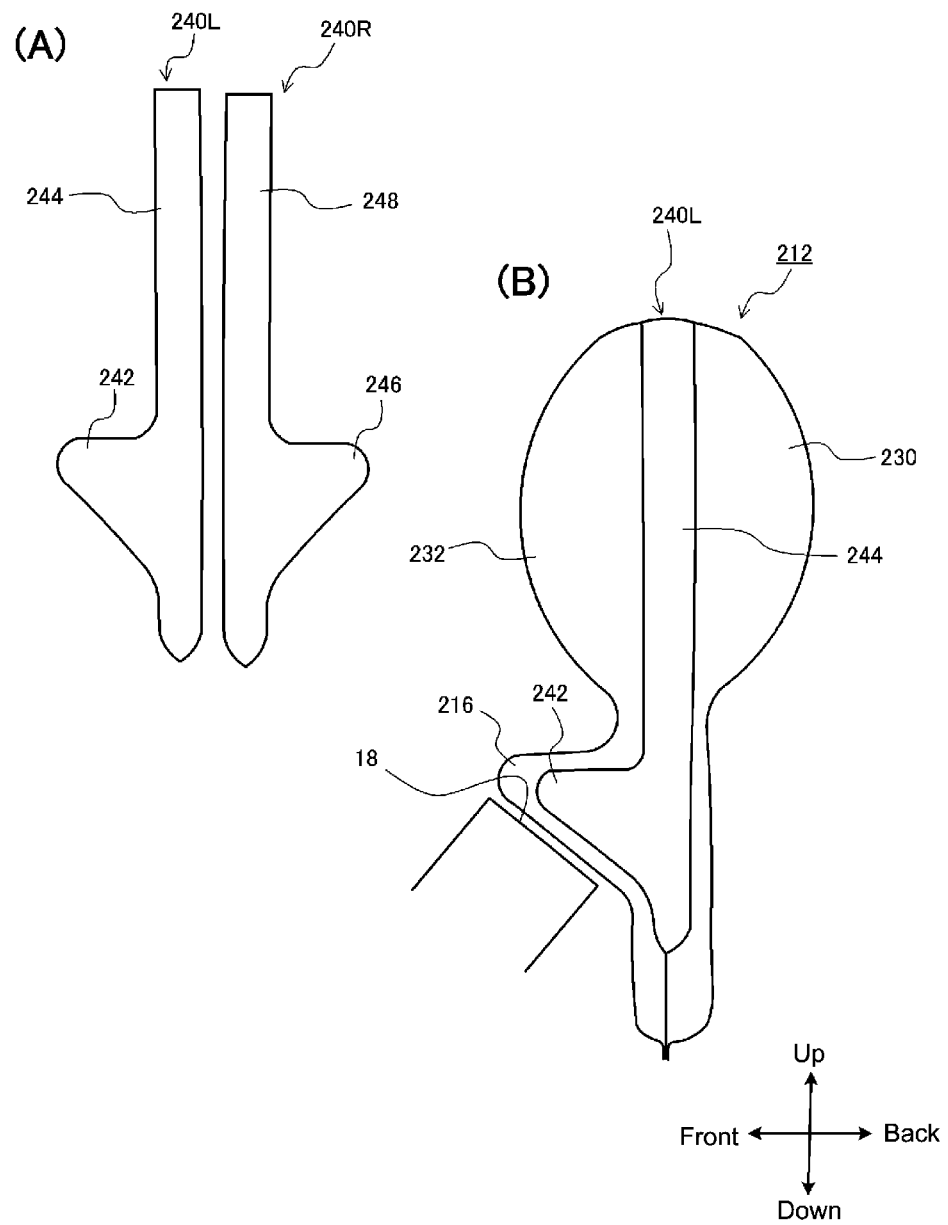
FIG. 6(A) is a plan view illustrating the shape of a side panel of an airbag adopted in the airbag device according to Embodiment 2 of the present invention.
FIG. 6(B) is a side view illustrating the deployed state of the airbag using the side panel shown in FIG. 6(A).

FIG. 6(A) is a plan view illustrating the shape of side panels (240L, 240R) of an airbag 212 utilized in the airbag device according to Embodiment 2 of the present invention. On the other hand, FIG. 6(B) is a side view illustrating a deployed state of the airbag 212 that uses the side panels (240L, 240R) illustrated in FIG. 6(A).

In this Embodiment, the left side panel 240L includes a convex portion 242 protruding in a substantially triangular shape and a band-shaped portion 244. Similarly, the right side panel 240R includes a convex portion 246 that protrudes in a substantially triangular shape and a band-shaped portion 248.

Furthermore, as illustrated in FIG. 6(B), the side panels 240L and 240R are joined to the boundary portion between the front panel 232 and the rear panel 230 by sewing or adhesion.

Also in this Embodiment, as in Embodiment 1 described above, the front panel 232 is pulled by the convex portions 242 and 246 of the side panels 240L and 240R, causing the stepped portion 216 to be formed over the entire width of the front panel 232. Furthermore, when the airbag 212 is deployed, the lower surface of the stepped portion 216 comes into contact with the structural portion 18.

In this embodiment, the left and right side panels 240L and 240R are directly joined to each other in the vicinity of the lower end portion of the airbag 212. Note, a side panel with a structure extending around the entire circumference of the edges of the front panel 232 and rear panel 230 can be used.

Embodiments of the present invention have been described above. However, the present invention is in no way limited by these embodiments and may be changed within a scope of technical ideas set forth in the patent claims.

The invention claimed is:

1. A motorcycle airbag device, the airbag device being mounted on a motorcycle, comprising:
    a gas generator for generating expansion gas; and
    an airbag that is configured to be expanded by the expansion gas and be deployed in front of an occupant so as to restrain forward movement of the occupant, wherein the airbag includes a stepped portion that protrudes forward and upon deployment, is supported on a structural portion surrounding a top of handlebars of the motorcycle,
    wherein the airbag comprises:
        a rear panel configured to face an occupant, the rear panel comprising a substantially circular main region and a substantially rectangular lower region connected to the main region;
        a front panel opposite the rear panel, the front panel comprising a substantially circular main region and a substantially rectangular lower region connected to the main region;
        a first side panel coupled with the rear panel and the front panel, wherein the first side panel includes at least a portion having a substantially triangular shape; and
        a second side panel coupled with the rear panel and the front panel, wherein the second side panel includes at least a portion having a substantially triangular shape,
    wherein the stepped portion is formed by the first side panel and the second side panel comprising a right convex portion positioned on a right side of the airbag and a left convex portion positioned on a left side of the airbag such that the right convex portion and the left convex portion are configured to, upon deployment of the airbag, form the stepped portion.

2. The motorcycle airbag device according to claim 1, wherein the first side panel and the second side panel connect at least a portion of outer edges of the front panel and the rear panel.

3. The motorcycle airbag device according to claim 2, wherein in a deployed state, the right convex portion and the left convex portion protrude forward when the airbag is viewed from the side.

4. The motorcycle airbag device according to claim 3, wherein the right convex portion and the left convex portion are configured to pull the front panel, causing the stepped portion to be formed.

5. The motorcycle airbag device according to claim 1, wherein the structural portion includes an upper surface of an instrument.

6. The motorcycle airbag device according to claim 1, wherein the stepped portion is formed during deployment by shapes of the first and second side panels alone and without use of a tether.

7. The motorcycle airbag device according to claim 1, wherein the lower region of the front panel is longer than the lower region of the rear panel.

8. The motorcycle airbag device according to claim 7, wherein two edges of each of the first and second side panels are coupled with the front panel, and wherein a third edge of each of the first and second side panels is coupled with the rear panel.

9. The motorcycle airbag device according to claim 1, wherein two edges of each of the first and second side panels are coupled with the front panel, and wherein a third edge of each of the first and second side panels is coupled with the rear panel.

10. The motorcycle airbag device according to claim 1, wherein edges of the front panel and the rear panel that are not coupled with the first or second side panels are connected to each other.

11. The motorcycle airbag device according to claim 1, wherein the first side panel is connected with the substantially rectangular lower region of the front panel and the substantially rectangular lower region of the rear panel.

12. The motorcycle airbag device according to claim 11, wherein the second side panel is connected with the substantially rectangular lower region of the front panel and the substantially rectangular lower region of the rear panel.

13. The motorcycle airbag device according to claim 1, wherein the first side panel is wholly defined by a substantially triangular shape, and wherein the second side panel is wholly defined by a substantially triangular shape.

14. The motorcycle airbag device according to claim 1, wherein the first side panel comprises a portion protruding in a substantially triangular shape, and wherein the second side panel comprises a portion protruding in a substantially triangular shape.

15. The motorcycle airbag device according to claim 14, wherein the first side panel further comprises a band shaped portion, and wherein the second side panel further comprises a band shaped portion.

16. The motorcycle airbag device according to claim 15, wherein the band shaped portions of the first and second side panels are coupled to the front panel and the rear panel of the airbag.

17. The motorcycle airbag device according to claim 16, wherein the band shaped portions of the first and second side panels are joined to opposing boundary portions between the front panel and the rear panel.

* * * * *